Jan. 2, 1923.

F. A. STEVENS.
OPHTHALMIC MOUNTING.
FILED MAY 5, 1920.

1,441,041.

2 SHEETS—SHEET 1.

Inventor:
Frederick A. Stevens.
By David Runa
Attorney.

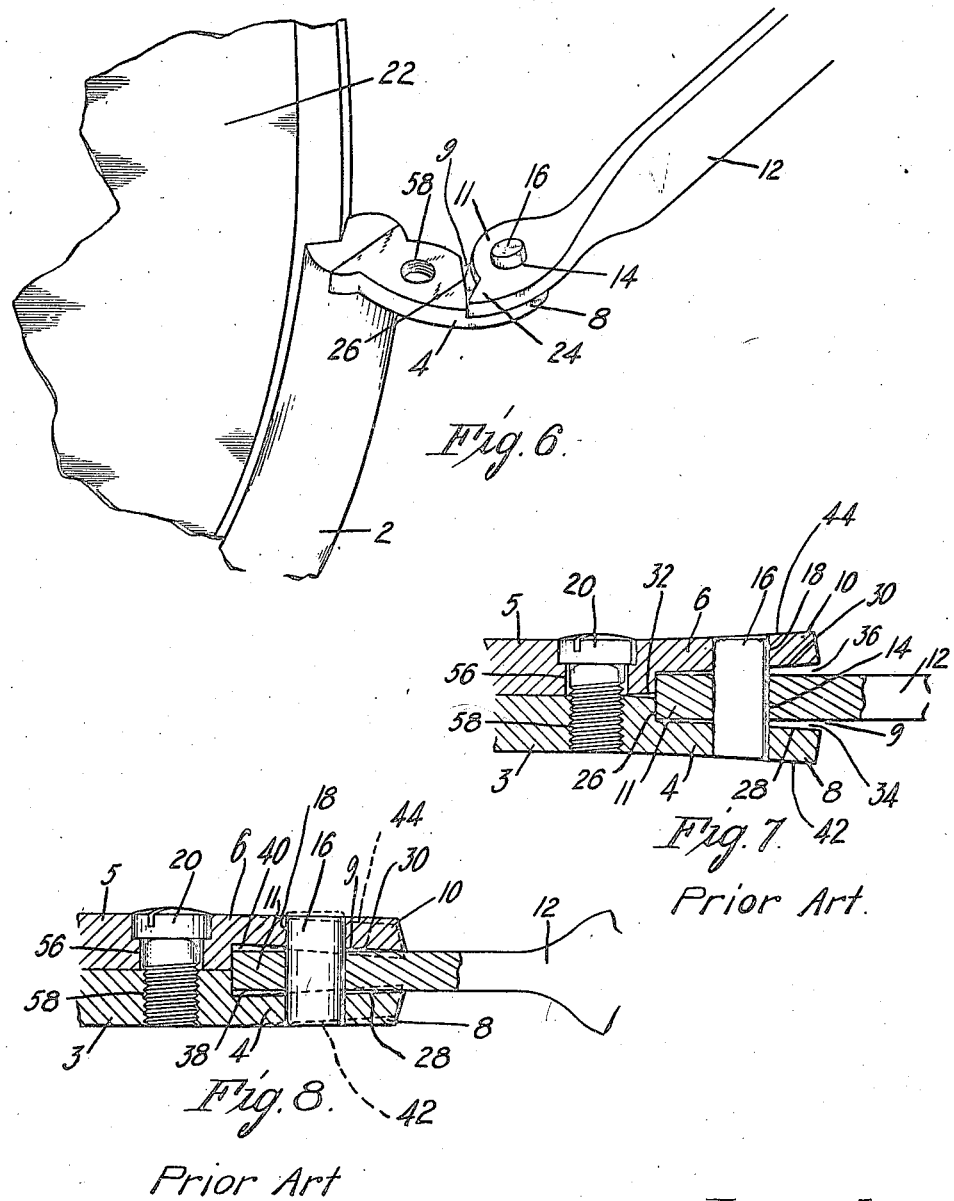

Patented Jan. 2, 1923.

1,441,041

UNITED STATES PATENT OFFICE.

FREDERICK A. STEVENS, OF PROVIDENCE, RHODE ISLAND, ASSIGNOR TO STEVENS AND COMPANY, INC., OF PROVIDENCE, RHODE ISLAND, A CORPORATION OF RHODE ISLAND.

OPHTHALMIC MOUNTING.

Application filed May 5, 1920. Serial No. 378,979.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings and more particularly to temple connections for spectacles.

The objects of the invention are to improve and simplify ophthalmic mountings of the above-described character, reducing their cost of manufacture, rendering them more attractive in appearance, and eliminating looseness in the temple joints.

With this end in view, the invention consists of the improved ophthalmic mounting hereinafter described, illustrated in the accompanying drawings and defined in the appended claims.

Figure 1:
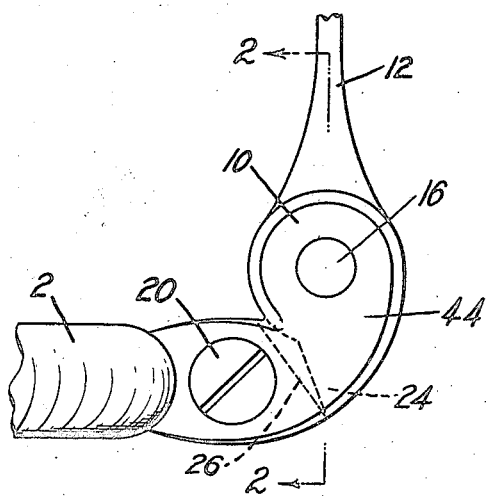
Figure 2:
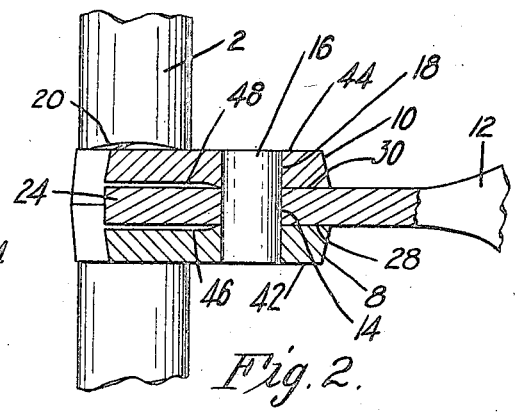
Figure 3:
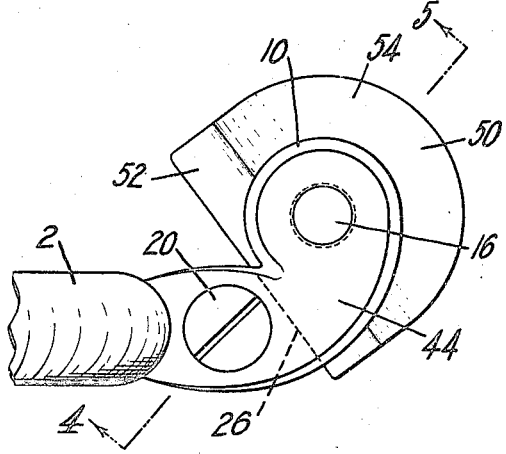
Figure 4:
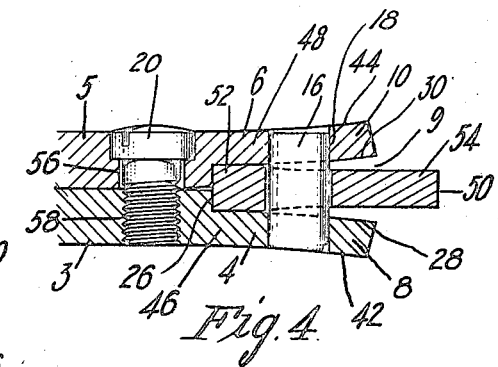
Figure 5:
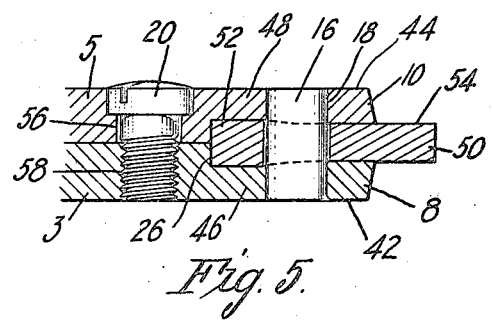

In the drawings, Fig. 1 is a fragmentary plan view of a portion of a pair of spectacles; Fig. 2 is a sectional view illustrative of the invention, taken upon the line 2—2 of Fig. 1, looking in the direction of the arrows; Fig. 3 is a view similar to Fig. 1, illustrating a process of manufacture; Figs. 4 and 5 are views taken upon the line 4—5 of Fig. 3, looking in the direction of the arrows, showing successive steps in the process of manufacture; Fig. 6 is a perspective view of an end piece, shown secured to a lens rim, with a temple in position upon the end piece; and Figs. 7 and 8 are views illustrative of prior-art structures.

Spectacles of a well-known type comprise the split rims 2 having end pieces 4 and 6 the inner portions 3 and 5 of which, where they are secured to the rims, are plate-like in form, and the outer or terminal portions 8 and 10 of which are reduced in thickness, as shown in Figs. 7 and 8, so as to form a pocket 9 for the flattened pivot ear 11 of a temple 12. The pivot ear is provided with an eye 14 whereby the temple may be pivotally mounted over a dowel 16 that is secured upon the end piece 4 and that is adapted to enter an opening 18 in the end piece 6. The end pieces are secured together by a screw 20 to maintain a lens 22 in position within the rim, the temple 12 upon the dowel 16, and the dowel within the opening 18. The pivot ear is provided with a projecting point 24 adapted to engage the limiting wall 26 of the pocket 9, thereby to limit the pivotal movement of the temple about the dowel.

As loose temple connections are highly objectionable, many expedients have been resorted to in the past aiming to provide a smoothly acting, but tight, joint. It has been proposed, for example to employ spring washers and other mechanisms for taking up slack and thereby maintain the joint tight. Complications in structure can not, however, prove commercially practicable in an art where simplicity and neatness are all important. All prior attempts have accordingly met with failure for one or another reason.

In the endeavor to return to simplicity of structure, the pivot ear 11 has been made slightly thicker than the distance between the inner faces 28 and 30 of the end-piece terminals 8 and 10, so that portions of these faces might bear frictionally upon the corresponding faces of the pivot ear 11 and thus hold the temple against loose swinging movement. This structure is, however, though simple, subject to two chief objections, among others. In the first place, the joint is unsightly because of the inner slit 32 that necessarily appears between the end pieces at the wall 26 of the pocket 9 and because of the uneven slits 34 and 36 that necessarily exist between the inner faces 28 and 30 and the pivot ear 11. In an article that is worn upon the face, the appearance of an otherwise very useful structure may drive it completely off the market. The slits, furthermore, are further objectionable in that they collect dirt. As the faces 28 and 30, secondly, can not lie flat upon the faces of the temple ear which they respectively engage, the pressure exerted upon the temple ear is not uniform. When the temple is in its limiting outward position, for example, in which the point 24 engages the wall 26, the spring action of the end pieces upon the temple ear will be far greater than in other positions when the point 24 is completely outside the pocket 9.

The degree of opening of the slits is also more marked. The consequence is that the same temple connection may afford an undesirably tight joint in some positions of the temple and as undesirably loose a joint in other positions of the temple.

like in form, the terminal portions of which are reduced in thickness, and the intermediate portions of which are still further reduced in thickness, the outer faces of the end pieces lying each in a plane substantially at right angles to the rim, and a temple having a flattened pivot ear of thickness substantially equal to the distance between the inner faces of the terminal portions mounted between the terminal portions, the pivot ear having a projecting point extending beyond the terminal portions and adapted to enter freely the space between the intermediate portions, whereby uniform tension is exerted upon the pivot ear in all positions of the temple.

5. An ophthalmic mounting having, in combination, a split lens rim having end pieces the inner portions of which are plate-like in form, the terminal portions of which are reduced in thickness and are flat upon their inner faces, and the intermediate portions of which are still further reduced in thickness, the outer faces of the end pieces lying each in a plane substantially at right angles to the rim, one of the flat-faced terminal portions being provided with a dowel and the other flat faced terminal portion having an opening which the dowel is adapted to enter, and a temple having a flattened pivot ear of thickness substantially equal to the distance between the flat faces of the terminal portions provided with an eye whereby the temple may be pivotally mounted about the dowel with the flat faces of the pivot ear in contact with the flat faces of the terminal portions, the ear having a projecting point for limiting the movement of the temple extending beyond the terminal portions and adapted to enter freely the space between the intermediate portions, whereby uniform tension is exerted upon the pivot ear in all positions of the temple.

6. The method of making an ophthalmic mounting which comprises placing a symmetrical former plate that is thicker at one end than at the other into the pocket formed between the reduced terminal portions of the end pieces of a split lens rim, with the thicker end lying against the wall of the pocket, pressing the end pieces inwardly towards each other against the former plate to swage the inner faces of the end pieces to conform to the shape of the former plate, whereby the end pieces will be provided with unswaged terminal portions and swaged intermediate portions, and holding the end pieces against lateral movement during the swaging operation.

7. An ophthalmic mounting having, in combination, two members having inner faces oppositely disposed portions of which are substantially flat and parallel, and other oppositely disposed portions of which are at a greater distance apart than the flat portions, to provide an increased space between them, and a plate member pivotally mounted between and in contact with the flat portions having a projecting point extending beyond the flat portions and adapted to enter freely the increased space between the said other portions, whereby uniform tension is exerted upon the plate member in all pivotal positions of the plate member.

In testimony whereof, I have hereunto subscribed my name this 19th day of April, 1920.

F. A. STEVENS.